United States Patent [19]

Jordan et al.

[11] 4,003,046
[45] Jan. 11, 1977

[54] COTTON GIN MONITORING SYSTEM

[76] Inventors: Robert E. Jordan, Rte. 8, Box 1479; Lloyd D. Miller, 4001 W. 28th, both of Pine Bluff, Ark. 71601

[22] Filed: Sept. 12, 1975

[21] Appl. No.: 612,629

[52] U.S. Cl. ............................. 340/271; 324/161; 324/167; 340/263; 340/267 R
[51] Int. Cl.² ...................................... G08B 21/00
[58] Field of Search ........ 340/271, 263, 62, 267 R, 340/267 C, 259, 261; 324/167, 161, 166, 160

[56] References Cited
UNITED STATES PATENTS

| | | | |
|---|---|---|---|
| 3,201,776 | 8/1965 | Morrow et al. | 340/267 R |
| 3,365,614 | 1/1968 | Luongo et al. | 340/271 |
| 3,527,928 | 9/1970 | Ryder et al. | 340/267 R |
| 3,583,405 | 6/1971 | Gerhardt et al. | 340/271 |
| 3,611,343 | 10/1971 | Schoenbach | 340/271 |
| 3,691,462 | 9/1972 | Grundy | 324/166 |
| 3,771,122 | 11/1973 | Sattler | 340/263 |
| 3,913,085 | 10/1975 | Farstad | 340/261 |
| 3,918,037 | 11/1975 | Hall | 340/267 C |

Primary Examiner—Glen R. Swann, III
Attorney, Agent, or Firm—Berman, Aisenberg & Platt

[57] ABSTRACT

A system for monitoring the operation of a plurality of rotating-shaft machines, including a switchable meter to indicate the shaft speed of any one of these machines. Each machine has a monitoring circuit including respective visual warning branch circuits to indicate if the machine shaft falls below a first preset speed and then to indicate if the machine shaft falls below a second preset speed, with provision for sounding an audible alarm. The system has a single power supply, switchable meter, audible alarm control circuit and warning reset circuit, and identical monitor modules for the respective machines to be monitored. Each module has an external sensor, consisting of a pickup coil and a magnet assembly attached to the rotating shaft of the monitored machine; a high-gain integrated circuit amplifier to amplify the pulses from the sensor; circuitry to convert the pulses to a D.C. voltage proportional to shaft speed; visual warning and alarm lamps; a switch to connect the audible alarm to the module or optionally to disconnect it; separate high-gain integrated circuit amplifiers to control the indicating meter, visual warning, and visual/audible alarm; and multi-turn potentiometers, accessible from a common front panel to control sensitivity, speed range, meter circuit gain, and set points in percent of normal speed for the warning and alarm circuits.

20 Claims, 2 Drawing Figures

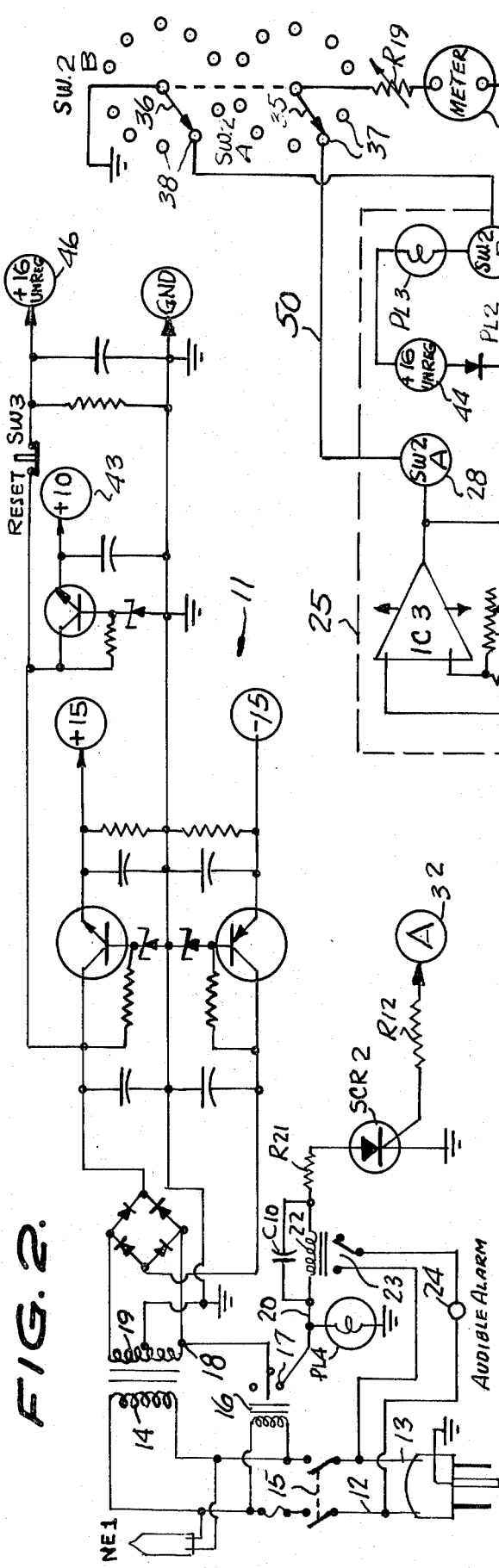
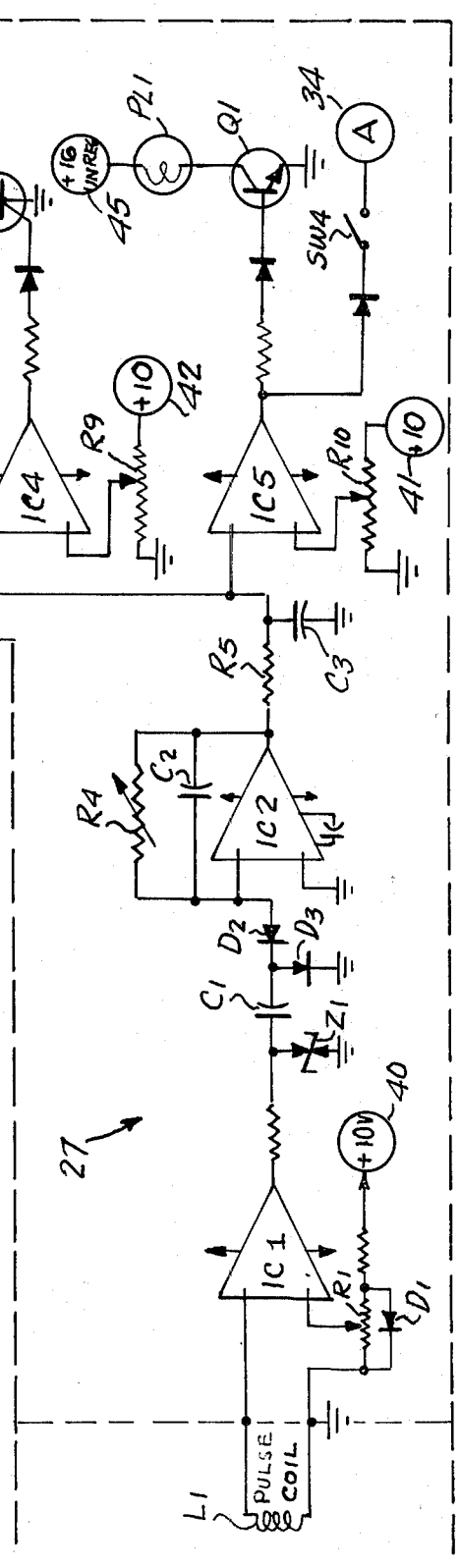
FIG. 1.
FIG. 2.

COTTON GIN MONITORING SYSTEM

BACKGROUND OF THE INVENTION

This invention relates to speed monitoring systems, and more particularly to devices for monitoring the speed of a plurality of rotating-shaft machines, such as cotton gins.

A main object of the invention is to provide a novel and improved monitoring system for use in areas which cannot be attended or constantly observed by the operator while the associated machines are in operation, such as in a multi-unit cotton gin plant, and for use in indicating in percentages the loading conditions of particular pieces of equipment and for signaling a warning should the equipment become loaded to a critical state; the monitoring system is intended to provide a first visual warning at a preset level speed, and to provide an additional visual warning as well as an audible alarm should the speed drop below a second preset value or become inoperable.

A further object of the invention is to provide an improved monitoring system for rotating-shaft machines which employs totally electronic parts, which can be manufactured in a manner which will offer operational simplicity, which can be set up employing plug-in modules in dust-proof enclosures and which can be designed with the capability of monitoring a substantial number of rotating shafts in a centralized unit.

BRIEF DESCRIPTION OF THE DRAWINGS

Further objects and advantages of the invention will become apparent from the following description and claims, and from the accompanying drawings, wherein:

FIG. 1 is a schematic circuit diagram of one of the shaft speed-sensing modules employed in an improved monitoring system constructed in accordance with the present invention.

FIG. 2 is a schematic wiring diagram of a common power supply unit which can be employed to energize a plurality of modules such as that shown in FIG. 1, in a monitoring system according to the present invention.

DETAILED DESCRIPTION OF A PREFERRED EMBODIMENT

In multi-unit cotton gin plants it is difficult to supervise the various machines individually due to their physical separation, noisy and cramped conditions, and insufficiency of supervisory personnel. There is an important need for monitoring the speed of the machine relative to 100% efficiency and to obtain a warning when any machine becomes overloaded or is in a critical state. A prime purpose of the present invention is to give the operator at a central location a visual warning of the overloading of a particular machine, and also, if the monitored machine becomes inoperative, to provide an audible alarm as well as a visual warning. This is especially important during busy periods of plant operation when the machines run for lengthy times and wherein it is necessary to detect approaching breakdowns early so that remedial measures can be quickly taken, whereby to avoid such breakdowns and to avoid protracted inoperativeness of the machines. It is also desirable, to minimize strain and tension on an operator, to enable him to monitor the machines from a central convenient location rather than to require him to inspect the various machines individually to ascertain their conditions.

Referring to the drawings, 11 designates a common power supply unit of generally conventional design having the input supply conductors 12 and 13 connected to the power transformer primary winding 14 through a main control switch 15. A relay 16 has its winding connected in parallel with the primary winding 14 and has normally open contacts 17. Said contacts are connected between one ungrounded terminal 18 of the secondary 19 of the power transformer and a wire 20. An "on" indicator lamp PL4 is connected between wire 20 and ground. Also connected in series between wire 20 and ground is the winding of a D.C. alarm relay 22, a resistor R21 and a silicon controlled rectifier SCR2. A capacitor C10 is connected across the winding of relay 22. The relay 22 has normally open contacts 23 which are connected in a circuit with an audible alarm device 24, said circuit being connected to supply conductors 12 and 13. Thus, the audible alarm device 24 becomes energized when SCR2 conducts.

The gate electrode of SCR2 is connected to a terminal 32 through a resistor R12.

A plurality of identical plug-in monitor modules 25 at the monitoring station are connected to the common power supply unit 11 so as to be energized therefrom, each module being associated with a remote machine to be monitored. Each module has an external sensor consisting of a remote stationary pickup coil L1 located in the field of a suitable magnet assembly attached to the rotating shaft of the monitored machine. The module 25 comprises a high-gain integrated circuit amplifier 27 to the input of which the pulse coil L1 is connected, which amplifies the pulses from the coil, and which is provided with circuitry to convert the pulses to a D.C. voltage at an output terminal 28 which is proportional to shaft speed. The module 25 also includes respective indicator lamps PL3, PL2 and PL1, a switch to connect the audible alarm circuit of unit 11 to the module or optionally to disconnect it, respective high-gain integrated circuit amplifiers IC3, IC4 and IC5 to control an indicating meter 33, the visual warning lamp PL2, and the visual warning lamp PL1 and audible alarm device SCR2 (when switch SW4 is closed.) (The module A terminal 34 is connected to the power unit A terminal 32 when the module is plugged in.)

Each module 25 also includes respective multi-turn potentiometers R1, R6, R9, and R10, and variable resistor R4 accessible from its front panel, to control sensitivity, speed range, meter circuit gain, and set points in percent of normal speed for the warning and the alarm circuits.

The system is provided with a 2-pole multi-contact selecting switch SW2A-SW2B having the respective poles 35 and 36. Pole 35 is selectively engageable with contacts 37 connected to the respective terminals 28 of the monitoring modules 25. Pole 35 is connected through the adjustable resistor R19 and meter 33 to ground. Pole 36, which is connected to ground, is selectively engageable with contacts 38, connected through terminals 39 and lamps PL3 to the positive supply terminals 44 on the monitoring modules 25.

The modules 25 have respective positive voltage supply terminals 40, 41, 42 which are connected to a 10-volt positive output terminal 43 of power unit 11 when the modules are plugged in. The modules also have positive voltage supply terminals 44, 45 which are connected to a 16-volt positive output terminal 46 of power unit 11 when the modules are plugged in.

The common power unit 11 is provided with a reset switch SW3 in circuit with the output terminal 46, for a purpose presently to be described.

Further structural features of the system will be pointed out in connection with the following description of its operation:

As the shaft being monitored rotates, the magnet assembly attached to the shaft passes pulse coil L1, producing a positive voltage pulse and a negative pulse with each revolution of the shaft. These pulses are amplified by the high-gain integrated circuit operational amplifier IC1 and clamped to a fixed voltage level by zener diode Z1. A sensitivity control comprising resistor R1 and diode D1 establishes a threshold level for input pulses to prevent interference from stray electromagnetic fields.

Capacitor C1 is alternatively charged positively through diode D3 and negatively through diode D2 so that a fixed electricl charge is transferred from C1 to C2 for each pair of pulses. Current through variable resistor R4 is proportional to the number of pulses per second, and thus to shaft speed. Adjustment of R4 sets the relation between pulses per second and the voltage at the output of amplifier IC2, and so determines the speed range. Ripple in this voltage is filtered by C2, R5 and C3.

The voltage from IC2 is amplified by linear amplifier IC3, with voltage gain established by R7 and variable meter control resistor R6

$$\left(\text{gain} = \frac{R6 + R7}{R7}\right).$$

. The output from IC3 is connected to one contact 37 of meter selector switch section SW2A through its connection at its terminal 28 by a wire 50. As will be apparent, by rotating the poles of switch SW2A-SW2B, the meter may be connected to any of the monitor modules 25 to indicate the speed of the machine connected to that module. Pilot lamp PL3 is energized on the selected module, indicating that the speed of this particular machine is being displayed on the panel meter 33.

Potentiometer R9 is set to a voltage corresponding with the output of IC2 at the shaft speed below which the first visual warning lamp PL2 is to be activated. When the speed falls below the set speed, the output of amplifier IC4 is a positive voltage. Silicon controlled rectifier SCR1 is turned on, causing warning lamp PL2 to light. If the speed increases above the set point, the output of IC4 goes negative, removing the drive from the gate electrode of SCR1. Current continues to flow through SCR1, keeping lamp PL2 lighted, until reset switch SW3 in the power supply section 11 is momentarily opened.

In a like manner, potentiometer R10 is set to correspond to a shaft speed below which the second visual alarm lamp PL1, and optionally, the audible alarm, is to be activated. When the shaft speed falls below this second set speed, the output of IC5 becomes positive, causing transistor Q1 to conduct current and causing visual alarm lamp PL1 to light. If switch SW4 is closed, a positive gate voltage is applied to silicon controlled rectifier SCR2, causing it to conduct half-wave rectified A.C. current and energize D.C. alarm relay 22, thus energizing the external audible alarm device 24. If the speed thereafter increases above said second set point, Q1 and SCR2 cease conducting and both the visual alarm lamp PL1 and the audible alarm device 24 are turned off.

The continued energization of lamp PL2, even if the speed later rises above the first speed set point, provides the machine operator with the information that the machine had reached a critical state and returned to normal should he not have been in the immediate area at the time of abnormal loading. However, should the reset switch SW3 be opened and the critical load condition indication returns upon release of the reset switch button, this indicates that the machine is still under a critical load.

The critical loading visual warning given by lamp PL2 is adjustable from zero to 100%.

The alarm circuitry visual warning given by lamp PL1 is also adjustable from zero to 100%. This alarm is different from the critical state warning, so there is no reset button to depress, and, should the alarm become activated, and the machine return to normal, the alarm will also return to a normal state. If, at the operator's discretion he decides to disregard the audible alarm, it can be switched to an "off" position by opening switch SW4, but the visual indication given by lamp PL1 cannot be switched off and will continue to indicate equipment failure.

The above-described apparatus employs highly reliable electronic circuitry of relatively simple design and adaptable to severe environmental conditions such as presence of dust, moisture and large temperature differentials. The life expectancy of the apparatus is substantial since the components are relatively rugged and do not dissipate appreciable heat.

The RPM monitoring range can be from about 30 RPM to several thousand RPM. The apparatus can easily be installed and calibrated to read the exact RPM on a digital or analog meter. However, from a manufacturing standpoint and for practical use, it is preferable to make the monitoring range relevant to a 100% indication which can be simply adjusted from the front panel (as also are the warning and alarm set points). This feature allows for simple installation, and the adjustments can be easily changed during machine operation without having to disassemble the apparatus in an effort to reach desired set point adjustments.

The audible alarm device 24 can be external to the monitoring instrument, and a number of alarms can be used, such as horns, sirens, bells, or the like.

An automatic changeover device, changing over from one machine to another, may be incorporated with the alarm or used to turn other related machinery off when the machine being monitored fails.

As will be apparent from the foregoing description, the apparatus is almost totally electronic and can be manufactured in a manner offering operational simplicity, plus the convenience of plug-in modules and the ability to employ a dustproof enclosure. It can be designed with the capability of monitoring 10 or more shafts per unit. The sensing portions, namely, the pickup head assembly can be of relatively simple construction, consisting of a small magnet and coil, which may be readily attached respectively to the shaft and adjacent stationary structure of the machine to be monitored without the need of experience, close tolerance, or complicated hardware.

While a specific embodiment of an improved apparatus for monitoring a plurality of rotating shaft machines has been disclosed in the foregoing description, it will be understood that various modifications within the spirit of the invention may occur to those skilled in the art. Therefore, it is intended that no limitations be placed on the invention except as defined by the scope of the appended claims.

What is claimed is:

1. Means to monitor the speed of a rotating shaft comprising pulse generating means at the shaft for generating electrical pulses at a rate in accordance with the shaft rotational speed, means to generate a voltage of a magnitude in accordance with the pulse rate, means to measure said voltage, whereby to indicate relative shaft speed, voltage-responsive first indicator means energized when said voltage decreases to a first preset warning value corresponding to a critical shaft speed, voltage-responsive second indicator means energized when said voltage decreases below said first preset warning value to a lower second preset warning value corresponding to a bottom limit shaft speed, and means to turn off the second indicator means if the shaft speed subsequently rises above said bottom limit shaft speed but to hold the first indicator means energized if the shaft speed subsequently rises above said critical shaft speed.

2. The shaft speed monitoring means of claim 1, and wherein said first indicator means comprises a D.C. source, and a lamp and a silicon controlled rectifier connected in series to said D.C. source, and circuit means connecting the output of said voltage generator means to the gate electrode of said silicon controlled rectifier.

3. The shaft speed monitoring means of claim 2, and wherein said second indicator means comprises a D.C. source, and a lamp and a transistor having a base and connected in series to said last-named D.C. source, and circuit means connecting the output of said voltage generating means to the base of said transistor.

4. The shaft speed monitoring means of claim 3, and audible alarm means, and circuit means to energize said alarm means concurrently with said second indicator means.

5. The shaft speed monitoring means of claim 4, and wherein said last-named circuit means comprises an A.C. source, an audible alarm relay device and a second silicon controlled rectifier connected in series to said A.C. source, and circuit means connecting the output of said voltage generating means to the gate electrode of said second silicon controlled rectifier.

6. The shaft speed monitoring means of claim 5, and means to at times disconnect said first-named D.C. source from said first-named silicon controlled rectifier to reset said first indicator means to a non-indicating condition.

7. The shaft speed monitoring means of claim 1, and wherein said pulse generating means comprises a pickup element forming alternate positive and negative pulses responsive to shaft rotation, and wherein said voltage generating means comprises first amplifier means, circuit means connecting said pickup element to said first amplifier means, circuit means connected to the output of said first amplifier means such that positive and negative output pulses from said first amplifier means will be of a fixed magnitude, second amplifier means, a first capacitor connected to the output of said first amplifier means, a second capacitor connected between the input and the output of said second amplifier means, a first unidirectional current means connected between said first capacitor and ground such that pulses of positive polarity are conducted to ground, a second unidirectional current means connected between said first capacitor and the input of said second amplifier means such that pulses of negative polarity are transferred from said first capacitor to said second capacitor, and a resistor connected across said second capacitor, whereby the current through said resistor is proportional to the number of pulses per second formed by said pickup element and whereby the voltage at the output of said second amplifier means is proportional to shaft speed.

8. The shaft speed monitoring means of claim 7, and wherein the means to measure said last-named voltage comprises a voltmeter, and circuit means including a third amplifier means connecting the output of said second amplifier means to said voltmeter.

9. The shaft speed monitoring means of claim 8, and means to adjust the gain of said third amplifier means.

10. The shaft speed monitoring means of claim 8, and adjustable selector switch means connected between said voltmeter and the output of said third amplifier means.

11. The shaft speed monitoring means of claim 10, and visual indicator means, and means to enable said visual indicator means when said selector switch means is adjusted to connect said voltmeter to the output of said third amplifier means.

12. The shaft speed monitoring means of claim 10, and wherein said first indicator means comprises a D.C. source, and a lamp and a silicon controlled rectifier connected in series to said D.C. source and circuit means connecting the output of said second amplifier means to the gate electrode of said silicon controlled rectifier.

13. The shaft speed monitoring means of claim 12, and wherein said second indicator means comprises a D.C. source, and a lamp and a transistor having a base and connected in series to said last-named D.C. source, and circuit means connecting the output of said second amplifier means to the base of said transistor.

14. The shaft speed monitoring means of claim 13, and wherein the respective circuit means connecting the output of the second amplifier means to said gate electrode and to the base of said transistor each includes an adjustable-gain amplifier.

15. The shaft speed monitoring means of claim 13, and audible alarm means and circuit means to energize said audible alarm means concurrently with said last-named lamp.

16. The shaft speed monitoring means of claim 15, and wherein said last-named circuit means comprises an A.C. source, an audible alarm relay device and a second silicon controlled rectifier connected in series to said A.C. source, and circuit means connecting the output of said second amplifier means to the gate electrode of said second silicon controlled rectifier.

17. An electronic system for monitoring the operation of a plurality of rotating-shaft machines, said system having a common power supply and a plurality of substantially identical monitoring circuits connected respectively to said plurality of rotating-shaft machines for monitoring the speed of the shafts thereof and for providing an electrical speed signal for each said shaft to a common meter for said system through a machine select switch, each of said monitoring circuits comprising means for generating electrical pulses at a rate proportional to the speed of the associated shaft, first operational amplifier means for generating a voltage signal in response to said electrical pulses and having a magnitude proportional to said rate of generation thereof, second, third and fourth operational amplifier means connected in parallel with one another and in series with said first operational amplifier means, said second operational amplifier means for providing a speed signal to drive said common meter, said third operational amplifier means for providing a first output alarm signal when the magnitude of said voltage signal falls below a first critical level, said fourth operational amplifier means for providing a second output alarm signal when the magnitude of said voltage signal falls below a second critical level which is lower than said first critical level.

18. The electronic system as set forth in claim 17, further comprising first and second indicator means connected respectively to the outputs of said third and fourth operational amplifier means and responsive to said first and second output alarm signals for providing output indications thereof.

19. The electronic system as set forth in claim 18, wherein said first indicator means includes means for maintaining its output indication after being energized even if the magnitude of said voltage signal rises above said first critical level.

20. The electronic system as set forth in claim 19, wherein said second indicator means includes means for ceasing its output indication after first being energized when said voltage signal rises above said second critical level.

* * * * *